United States Patent [19]

Heitman

[11] 4,089,087
[45] May 16, 1978

[54] CLAMP FOR HYDRAULIC HOSES

[76] Inventor: Leroy Marvin Heitman, 28900 Ironwood, Sunnymead, Calif. 92388

[21] Appl. No.: 781,179

[22] Filed: Mar. 25, 1977

[51] Int. Cl.² .............................................. A44B 21/00
[52] U.S. Cl. ................................................. 24/81 TH
[58] Field of Search ............. 24/81 CC, 81 BA, 81 G, 24/132 WL, 255 SL, 24, 73 AS, 73 SA, 249 PP; 403/389, 391; 248/68 R, 74 R; 285/137 R

[56] References Cited

U.S. PATENT DOCUMENTS

| 534,345 | 2/1895 | Nilsson | 269/237 |
|---|---|---|---|
| 3,421,187 | 1/1969 | Ryder | 24/81 G |
| 3,537,150 | 11/1970 | Emberson | 24/249 R |
| 3,568,264 | 3/1971 | Crist et al. | 24/81 CC |
| 3,906,592 | 9/1975 | Sakasegawa | 24/81 CC |

Primary Examiner—Doris L. Troutman
Attorney, Agent, or Firm—Harvey C. Nienow

[57] ABSTRACT

A clamp for hydraulic hoses having a base member formed with one or more substantially half-circle cutouts and a clamp member pivotally connected to said base member and formed with corresponding substantially half-circle cutouts, such clamp member being pivotable from an open position to a closed or clamping position wherein the half-circle cutouts form full-circle passageways for individually retaining a hydraulic hose. A locking pin retains the clamp in its clamping position by insertion thereof in aligned through openings, there being a loop member or ring on the end of the locking pin to at least partially encircle the base and clamp members to retain the pin in its locked position.

5 Claims, 4 Drawing Figures

CLAMP FOR HYDRAULIC HOSES

The present invention relates generally to hose clamps, but more particularly to clamps for retaining hydraulic hoses in proper position on earth-working equipment.

In certain types of heavy equipment, as for instance on ground-working back-hoes, tractors and the like, hydraulic power is used to move and position various components and parts of the equipment. For instance, to move a ground-cutting blade or bucket, hydraulic pressure is employed to develop the necessary power.

The hydraulic hoses which extend from the reservoir to the hydraulic actuators, are flexible and of sufficient length to possibly interfere with other instruments or parts of the back-hoe or tractor. Because of this, it is desirable to retain such hoses in a fixed position to ensure that the equipment will not malfunction because of such interference and to prolong the life of such flexible hoses.

It is an object of the present invention to provide a hose clamp for hydraulic hoses which comprises a pair of relatively movable members, each of which is formed with a half-circle cutout which come together to provide a full-circle passageway for retention of the hydraulic hose.

Another object of the present invention is to provide a hose clamp for hydraulic hoses as characterized above which does not exert any pressure whatever on the hoses being clamped but rather merely retains the hoses in a fixed, troubled-free position.

An even further object of the present invention is to provide a hose clamp for hydraulic hoses as characterized above which can be quickly and easily opened or closed without the need for any special tools of instructions, thus enabling hoses to be replaced or repaired without undue time consumption.

A still further object of the present invention is to provide a hose clamp for hydraulic hoses as characterized above which is sturdy and will not deteriorate or malfunction in spite of inclement weather conditions or excessive vibrations and the like.

Another further object of the present invention is to provide a hose clamp for hydraulic hoses as characterized above having locking means which can be quickly unlocked to enable the hoses to be removed.

A still further object of the present invention is to provide a hose clamp for hydraulic hoses as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
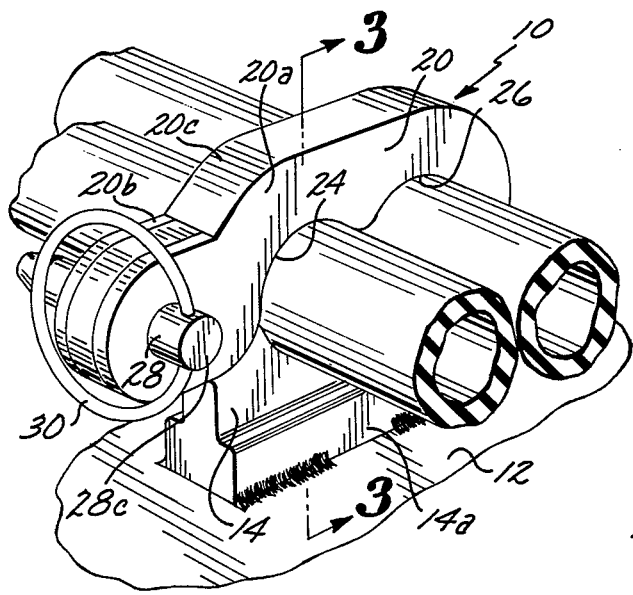
FIG. 1 is a perspective view of a hose clamp showing hydraulic hoses in clamped position.

Referring to FIG. 1 of the drawings, there is shown therein a hose clamp 10, according to the present invention, mounted on any appropriate relatively stationary member 12.

Figure 2:
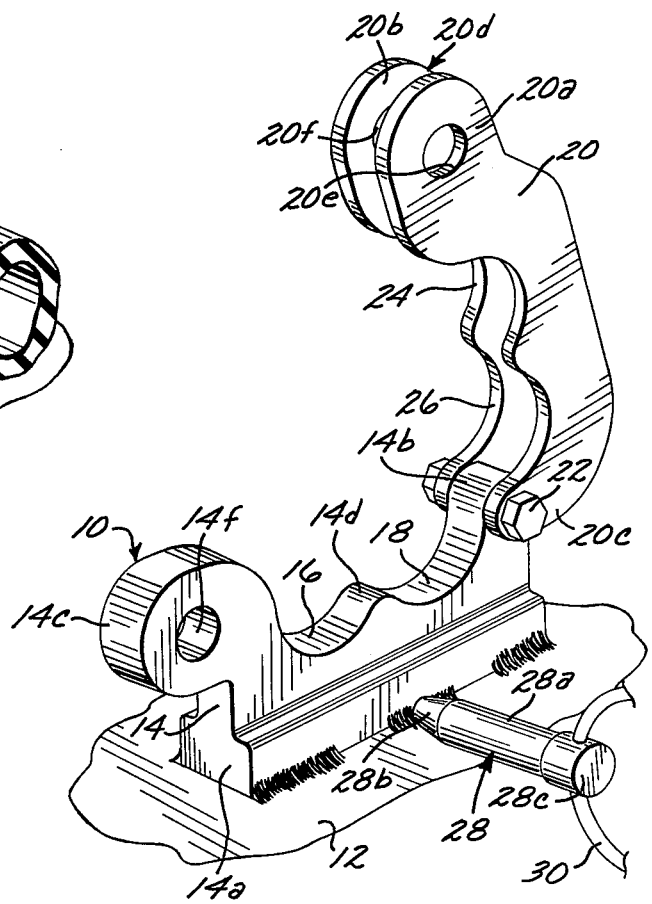
FIG. 2 is a fragmentary perspective view showing the hose clamp of FIG. 1 in open position.
Figure 3:
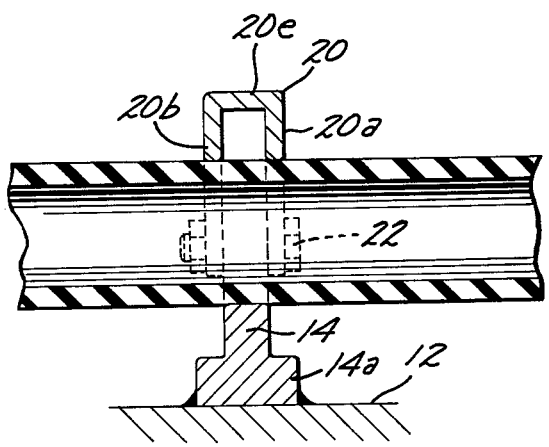
FIG. 3 is a sectional view taken substantially along line 3—3 of FIG. 1.

As shown most particularly in FIG. 2 of the drawings, hose clamp 10 comprises a base member 14 which may be formed of any appropriate hard material such as steel, wood, plastic or the like, and is formed with an enlarged bottom portion 14a to be secured to the relatively stationary member 12 in any appropriate manner as by welding, brazing, soldering, gluing or the like.

Base member 14 further comprises a pivotal end portion 14b and a clamping or locking end portion 14c. An intermediate portion 14d is formed with any appropriate number of half-circle cutouts, the embodiment chosen for illustration in the drawings of the present invention, having two such half-circle cutouts 16 and 18.

End portion 14b is provided with a through opening 14e and locking end portion 14c is formed with a through opening 14f.

A clamping member 20 is provided, having a pair of side plates 20a and 20b which are joined together by an intermediate portion 20c to provide a unitary structure as shown. The distance between the side plates 20a and 20b is such as to slidingly accomodate the end portions 14b and 14c of base member 14 as will hereinafter become more apparent. Clamp member 20 is formed with a rotatable mounting end portion 20c and a locking a clamping end portion 20d. The rotatable mounting end portion 20c is formed with aligned openings in the side plates 20a and 20b thereat, for receiving a pivot pin 22 which also extends through the opening 14e in the end portion 14b of base member 14. Such pivot pin may take the form of a fastening bolt having a head at one end and a nut at the other for firmly retaining the clamp member 20 and base member 14 in pivotal relationship.

Clamp member 20 is further formed, in each of its side plates 20a and 20b, with one or more half-circle cutouts as shown at 24 and 26. The side plates 20a and 20b are formed with substantially identical spaced cutouts which are substantially half-circle in construction.

The locking end portion 20d of member 20 is formed with aligned openings 20e and 20f in the side plates 20a and 20b.

Figure 4:
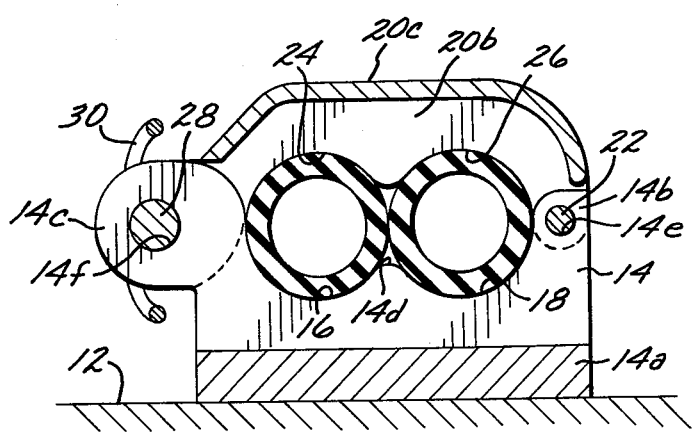
FIG. 4 is a longitudinal sectional view of the hose clamp of FIG. 1.

The clamp member 20 can be pivoted to a closed position, as shown in FIGS. 1 and 4, thereby causing hydraulic hoses to be firmly held in proper position. The half-circle cutouts 16 and 18 in base member 14 cooperate with the corresponding half-circle cutouts 24 and 26, respectively, in the clamp member 20 to provide substantially full-circle passageways for the hydraulic hoses. The size of such passageways ensures that the hoses are not firmly gripped or deformed, but rather are merely restricted from moving. That is, there is sufficient clearance between the full-circle passageways and the hoses to prevent damage or deformation of such hoses.

For locking the clamp in closed position, there is provided a locking pin 28 having a generally cylindrical shank 28a and a tapered end portion 28b. The shank 28a of pin 28 is of such size or diameter as to be easily inserted within the openings 20e, 14f and 20f when the clamp member 20 is in clamping position as shown in FIG. 1.

A loop member or ring 30 is connected to end portion 28c of locking pin 28, within a transverse opening or hole. Ring 30 can be pivoted with respect to pin 28 and, as shown in FIG. 1 of the drawings, when the pin 28 is fully inserted within the aligned openings 20e, 14f and 20f, the ring 30 can be positioned about the aligned end portions 20d of clamp member 20 and 14c of base member 14. The ring 30 thus prevents the pin 28 from inadvertently being removed from the aligned openings, the clamp 10 thereby being held in its closed position.

For use on heavy road grading or ground working equipment which is subject to heavy forces and considerable vibration, it has been found preferable to construct base member 14 and clamp member 20 of steel. Such hose clamp 10 is thus made extremely rugged and can withstand substantially all of the extraneous forces to be encountered.

When it is necessary to replace the hydraulic hoses or to have access to them for any reason, it is a simple matter to remove the ring or loop member 30 from around the aligned end portions 20d and 14c and then extract the pin 28 from the aligned openings 20d, 14f and 20f. The clamp member 20 can then be easily pivoted on base member 14 about the pivot pin 22. The reverse procedure is to be followed in returning the hydraulic hoses to the clamp 10, namely the clamp member 20 is returned to its closed position and the pin inserted in the aligned openings, with the retaining ring 30 as shown in FIG. 1.

It is thus seen that the present invention provides a tough and sturdy hose clamp, which is characterized by having side plates 20a and 20b and the intermediate portion 20c of which the clamp member 20 is constructed. Also contributing to such high strength construction is the fact that the clamp member, when in its locked position, straddles the base member 14 at its opposite ends.

Although I have shown and described certain specific embodiments of my invention, I am well aware that many modifications thereof are possible. The invention is not be restricted except insofar as is necessitated by the prior art.

I claim:

1. A hose clamp comprising in combination,
   a base member having opposite end portions and an intermediate portion formed with two substantially half-circle cutouts,
   a clamp member pivotally mounted to one end portion of said base member, formed with two substantially half-circle cutouts and a pair of spaced side plates to be positioned on opposite sides of said other end portion of said base member,
   and fastening means to engage said other end portion and said side plates to retain said clamp member in position to cause said cutouts to form a pair of full-circle passageways for individually retaining a hose.

2. A hose clamp according to claim 1,
   wherein said side plates are so spaced as to be juxtapositionable to said other end portion of said base member.

3. A hose clamp according to claim 2,
   wherein said fastening means includes a loop member to at least partially encircle said juxtapositioned plates and end portion.

4. A hose clamp comprising in combination,
   a base member having opposite end portions and an intermediate portion formed with at least one substantially half-circle cutout,
   a clamp member having one end pivotally mounted to one end portion of said base member, another end to be positioned adjacent the other end portion of said base member and an intermediate portion formed with at least one substantially half-circle cutout,
   said other end of said clamp member and said adjacent end portion of said base member being formed with aligned openings,
   and fastening means comprising a locking pin for insertion in said aligned openings and having a loop member to at least partially encircle the adjacent end and end portions of said clamp member and base member.

5. A hose clamp according to claim 4,
   wherein the intermediate portion of each of said base and clamp members comprises two substantially half-circle cutouts.

* * * * *